United States Patent Office 3,755,545
Patented Aug. 28, 1973

3,755,545
PROCESS FOR OBTAINING SODIUM AND AMMONIUM FLUORIDE BY THE TREATMENT OF PHOSPHONITRATE SOLUTIONS
Iuliu Virgil Florian Moldovan, Laurentia Cristescu, and Victoria Preda, Bucharest, Rumania, assignors to Institutul DeCercetari Chimice-Icechim, Bucharest, Rumania
No Drawing. Filed Jan. 4, 1971, Ser. No. 103,930
Claims priority, application Rumania, Jan. 15, 1970, 62,137
Int. Cl. C01c 1/16; C01d 3/02
U.S. Cl. 423—470       1 Claim

ABSTRACT OF THE DISCLOSURE

A process for the recovery of fluorine as sodium fluoride and/or ammonium fluoride from phosphonitrate solutions obtained by the reaction of nitric acid with phosphate rock. Calcium nitrate may be removed from the solution by precipitating it with cooling, whereupon fluorine is precipitated concomitantly with the precipitation of calcium by treating the filtrate or decantate from the separation of calcium nitrate with a quantity of sodium sulfate or sodium carbonate and ammonium sulfate or with sodium carbonate and ammonium sulfate in an excess of 1 to 300% above the stoichiometric quantity necessary for total fluorine removal, separating the resulting precipitate of sodium fluosilicate and calcium sulfate, and treating the precipitate with ammonia to solubilize the precipitate in the form of sodium fluoride and ammonium fluoride solution.

(1) FIELD OF THE INVENTION

The present invention relates to a process for the recovery of fluorine from phosphonitrate solutions obtained by the action on phosphate rock of nitric acid, subsequent to the more or less complete separation by cooling of calcium nitrate, the solutions being herein termed "final phosphonitrate solutions."

(2) BACKGROUND OF THE INVENTION

Methods are known for recovering fluorine from phosphonitrate solutions by treating them with potassium salts and precipitating fluorine in form of the potassium fluosilicate.

Some other processes are known for recovering fluorine from phosphoric acid containing 30 to 32% $P_2O_5$ and obtained by reacting phosphate rock with sulphuric acid; these processes treat the phosphoric acid solutions with sodium carbonate to precipitate fluorine in form of the sodium fluorine in form of the sodium fluosilicate.

In these processes using wet process phosphoric acid, there are present a slight excess of sulphuric acid and a small amount of soluble calcium sulphate, while in the above-mentioned phosphonitrate solutions there are present a large excess of nitric acid and a large amount of calcium salts of very varied composition. Thus different conditions are required for recovering fluorine from the solutions, with the possibility of obtaining defluorinated nitrophosphates as well as dicalcium phosphate.

In these processes the solubility of the sodium fluosilicate and of the potassium fluosilicate in the phosphonitrate solution creates difficulties. Moreover in the undefluorinated final phosphonitrate solutions subjected to ammoniation, the fluorine fixes the calcium in a form which is insoluble in water, for instance in the form of $CaF_2$. This increases the water solubility of $P_2O_5$ in complex fertilizers. The removal of fluorine only leads to the reduction of the solubility of $P_2O_5$ in the nitrophosphate fertilizers, the $P_2O_5$ being bonded to the residual calcium in the form of insoluble compounds.

(3) DESCRIPTION OF THE INVENTION

The process according to the invention avoids the above-mentioned disadvantages in that, to recover fluorine and to increase the water solubility of $P_2O_5$ of complex fertilizers obtained from the final phosphonitrate solutions, fluorine is precipitated in form of the sodium hexafluosilicate concomitantly with the precipitation or co-precipitation of calcium by treating the final phosphonitrate solutions with a quantity of sodium sulphate or sodium carbonate and sulphuric acid or, in a similar way, with sodium carbonate and ammonium sulphate, corresponding to an excess of 1 to 200% or to 1 to 300% with respect to the stoichiometric amount necessary for removing fluorine, followed by filtration or centrifugation of the mixture of sodium fluosilicate and calcium sulphate. The precipitate is washed and is processed with ammonia in order to pass fluorine into solution in form of sodium fluoride and ammonium fluoride, which may then be handled by known methods to produce fluorine salts.

(4) SPECIFIC EXAMPLES

The application of the process according to the invention is illustrated in the following four examples.

Example 1

100 g. of Algerian phosphate rock having a 3.9% F. and 54.5% CaO content were reacted with a 58% nitric acid in the presence of 0.5 g. of diatomite. After removal with cooling of the calcium nitrate and washing, 190 g. of a final phosphonitrate solution were obtained, having a content of 1.08% F., corresponding to 52% of the fluorine contained in the phosphate rock, and of 4.4% CaO, corresponding to 16% of the CaO of the rock.

100 g. of the fiinal phosphonitrate solution were treated with 1.5 g. of sodium carbonate, i.e., a 50% excess against the necessary above the calculated stoichiometric amount, dissolved in water in a liquid to solid ratio of 2:1; the fluorine is precipitated in the form of sodium fluosilicate.

After stirring for one hour at 20° C., the precipitate was filtered and washed, first with 2 g. of a 58% nitric acid and then with 4 g. of water, in a liquid to solid ratio of 2:1, collecting separately the washing solution. The rate of filtration of the precipitate was 14 kg./m.$^2$ h.

3 g. of a precipitate with 27% F. and 101 g. of defluorinated final phosphonitrate solution with 0.24% F. content resulted, corresponding to 21% of the fluorine in the final phosphonitrate solution and remaining therein.

In this way, 40% of the fluorine existing in the rock were separated in form of sodium fluosilicate.

The nitrophosphate obtained from the phosphonitrate solution had a water solubility of $P_2O_5$ of 76%.

Example 2

100 g. of Morocco phosphate rock having a 4.2% F. and 53.9% CaO content were reacted with a 58% nitric acid. After separation by cooling of calcium nitrate, while separately collecting the solutions resulting from washing the calcium nitrate, 100 g. of solution were obtained containing 8.1% CaO and 1.77% F. corresponding, respectively to 15% of the CaO and 40% of the F. existing in the rock.

100 g. of the resulting final phosphonitrate solution were treated with 4.25 g. of anhydrous sodium sulphate, i.e., 100% excess above the stoichiometric amount necessary for conversion of all of the fluorine into sodium fluosilicate.

After stirring for one hour at 20° C., the precipitate was filtered and washed with 6 g. of a 58% nitric acid and 12 g. of water, in a total ratio L/S of 2:1. The rate of filtration of the precipitate was 18 kg./m.$^2$ h.

9 g. of precipitate with 15.8% F resulted, corresponding to 2.4 g. of phosphate rock slurry, 2.4 g. of $Na_2SiF_6$ and 4.2 g. of CaSO$_4$, 2 H$_2$O. Thus the solution contained only 13% of the initial CaO; the water solubility of the fertilizer obtained by ammoniation of the defluorinated final phosphonitrate solution is thereby increased. Only 8% of the fluorine, 32% of the initial fluorine in the rock, is recovered as sodium fluosilicate.

The defluorinated phosphonitrate solution was further processed by known methods to obtain nitrophosphate fertilizers or dicalcium phosphate.

The nitrophosphate obtained from the phosphonitrate solution had a water solubility of P$_2$O$_5$ of 80%.

The precipitate was processed with ammonia in order to obtain soluble sodium fluoride and ammonium fluoride, which may be utilized to prepare other fluorine salts, such as HF, cryolite etc.

Example 3

100 g. of morocco phosphate rock, containing 4.2% F and 53.9% CaO, were reacted with a 58% nitric acid. After recovering the calcium nitrate by cooling and separating the solutions from washing the calcium nitrate, 100 g. of solution were obtained, containing 8.1% CaO and 1.77% F, corresponding respectively to 15% of the CaO and 40% of the F contained in the phosphate rock.

100 g. of the resulting final phosphonitrate solution were treated with 2.5 g. of sodium carbonate, i.e., a 50% excess over the stoichiometric amount required for conversion of fluorine into sodium fluosilicate, and with 14.0 g. of 100% sulphuric acid, in order to completely remove fluorine and CaO from the solution.

After stirring for one hour at 20° C., the precipitate was filtered and washed with 17 g. of a 58% nitric acid and 34 g. of water, in a total ratio L/S of 2:1, the washing solution being collected separately. The rate of filtration of the precipitate was 25 kg./m.$^2$h.

In the defluorinated final phosphonitrate solution remained 2% of the CaO and 6% of the F initially present in the phosphate rock.

The defluorinated phosphonitrate solution was further processed by known methods to obtain nitrophosphate fertilizers or fodder dicalcium phosphate.

The nitrophosphate obtained from the phosphonitrate solution had a water solubility in terms of P$_2$O$_5$ of 93%.

The resulting precipitate, 26 g., contained 2.52 g. of Na$_2$SiF$_6$, 2.4 g. of rock slurry and 21 g. of CaSO$_4$·2H$_2$O, corresponding to 32% of the fluorine present in the phosphate rock.

By diluting the precipitate with water and by ammoniation to pH=9, the sodium fluosilicate is hydrolyzed to sodium fluoride and ammonium fluoride, the slurry and the calcium sulphate remaining in the SiO$_2$ precipitate.

The sodium fluoride and ammonium fluoride solution may be utilized for the production of other fluorine salts, such as HF, cryolite, etc.

Example 4

The same procedure was followed as in Example 3, but the 14.0 g. of 100% sulphuric acid was replaced by stoichiometric amount of 18.8 g. of ammonium sulphate. The results were the same as in Example 3.

The present invention offers the following advantages:

The recovery and beneficial use of fluorine is ensured within the framework of the processes for producing complex fertilizers by the action on phosphate rock of nitric acid or for obtaining dicalcium phosphate.

A better filterability of sodium fluosilicate is ensured by co-precipitating the residual calcium of these solutions in the form of calcium sulphate.

An increased recovery of fluorine from the final phosphonitrate solutions is ensured simultaneously with the improvement of the water solubility of P$_2$O$_5$ in these complex fertilizers, thereby compensating for the fixation of calcium by fluorine ions at the ammoniation stage.

What we claim is:

1. A process for recovering fluorine in the form of a solution of sodium fluoride and ammonium fluoride, comprising the steps of:
    (a) treating fluorine- and calcium-containing phosphate rock with nitric acid to produce a phosphonitrate solution containing dissolved fluorine;
    (b) cooling said solution to precipitate calcium nitrate and separating said calcium nitrate therefrom;
    (c) treating said phosphonitrate solution from which calcium nitrate has been separated in step (b) simultaneously with sodium sulfate or sodium carbonate and sulfuric acid or simultaneously with sodium carbonate and ammonium sulfate to coprecipitate from said solution a mixture of sodium fluosilicate and calcium sulfate in an amount of substantially 1 to 300% above the stoichiometric quantity necessary for total precipitation of the fluorine contained in said solution;
    (d) recovering the precipitate of said mixture of sodium fluosilicate and calcium sulfate; and
    (e) treating said precipitate with ammonia to dissolve therefrom said sodium fluosilicate and form sodium fluoride and ammonium fluoride in solution.

References Cited
UNITED STATES PATENTS

| | | | |
|---|---|---|---|
| 2,683,075 | 7/1954 | Caldwell | 23—109 |
| 2,981,598 | 4/1961 | Tarbutton et al. | 23—88 |
| 3,021,194 | 2/1962 | Cunningham | 23—88 |
| 3,420,622 | 1/1969 | Donges et al. | 23—88 |
| 3,563,699 | 2/1971 | Cuneo et al. | 23—80 |

EDWARD STERN, Primary Examiner

U.S. Cl. X.R.

423—162, 341, 395, 472, 490, 535